219-121
8/30/83
OR    4,401,876
SR

United States Patent [19]
Cooper

[11]  4,401,876
[45]  Aug. 30, 1983

[54] WORKING GEMSTONES

[76] Inventor:  Martin Cooper, 38, Marsden Green, Welwyn Garden City, Hertfordshire, England

[21] Appl. No.: 264,710

[22] Filed: May 18, 1981

[30]  Foreign Application Priority Data

May 20, 1980 [GB] United Kingdom ................ 8016669
Aug. 7, 1980 [GB] United Kingdom ................ 8025737

[51] Int. Cl.³ ............................................ B23K 27/00
[52] U.S. Cl. ............................ 219/121 LJ; 125/30 R; 125/39; 219/121 LH; 219/121 LZ
[58] Field of Search .................. 219/121 LH, 121 LJ, 219/121 LU, 121 LW, 121 LZ; 125/30 R, 36, 39, 23 R

[56]  References Cited

U.S. PATENT DOCUMENTS 3,440,388  4/1969  Otstot et al. .......................... 219/69
3,527,198  9/1970  Takaoka .................... 219/121 LM X
3,700,850  10/1972  Lumley et al. ...................... 219/121

FOREIGN PATENT DOCUMENTS 877326  12/1979  Belgium .
130138  3/1978  Fed. Rep. of Germany .
133023  11/1978  Fed. Rep. of Germany .
1057127  2/1967  United Kingdom .
1059249  2/1967  United Kingdom .
1094367  12/1967  United Kingdom .
1254120  11/1971  United Kingdom .
1265241  3/1972  United Kingdom .
1292981  10/1972  United Kingdom .
1324903  7/1973  United Kingdom .
1326775  8/1973  United Kingdom .
1377131  12/1974  United Kingdom .
1405487  9/1975  United Kingdom .
1446806  8/1976  United Kingdom .
2052369  1/1981  United Kingdom ............. 125/30 R

OTHER PUBLICATIONS

Laser Institute of America, "Guide for Material Processing by Lasers" 1978.
"Industrial Diamond Review", Mar. 1980, pp. 90 and 91.
"Laser Application Notes", vol. 1, No. 1 of Feb. 1979.
"New Hyperyag", on Model DLPY 4-System 2000 Yag Laser.
"Diamonds": N.A.G. Press LTD, Chapter Eleven, pp. 235, 239-242.

Primary Examiner—C. L. Albritton
Attorney, Agent, or Firm—Shapiro and Shapiro

[57]  ABSTRACT

In order to provide a better way of kerfing a gemstone such as a diamond, a high energy, high pulse rate, low order mode, laser beam is employed to cut the kerf. Apparatus for kerfing a gemstone can in general comprise a laser, reflecting means which bends the incident beam through a substantial angle and which is moveable substantially parallel to the axis of the incident beam, and a focusing arrangement which focuses the beam on the gemstone.

7 Claims, 4 Drawing Figures

WORKING GEMSTONES

BACKGROUND OF THE INVENTION

Kerfing is forming a groove in the gemstone, which is done prior to cleaving; cleaving is parting a gemstone along a cleavage plane. There is a description of kerfing and cleaving in "Diamonds", by Eric Bruton, 2nd edition, 1978, NAG Press, London.

It will be understood that working a gemstone with a laser normally involves material removal, though in thermal cleaving the stone may be split along the cleavage plane without any material being removed.

The present description relates specifically to diamonds, but it is believed that it is generally applicable to other gemstones although some of the effects may be markedly different, such as in diamonds the presence of clear cleavage planes, the formation of graphite and the resulting higher absorption of energy, and the higher thermal and mechanical strength.

Working gemstones with lasers is found to give a combination of particular problems which is not met with when working other materials. For instance, the gemstones in general have a very low absorption of the laser energy, giving problems in reaching the working temperature; wastage of the gemstone must be kept very low due to the value of the gemstone material; likewise, a clean cut reduces later wastage of gemstone material; and chipping and subsequent blowing off of pieces of the gemstone can occur and can be very wasteful.

Furthermore, kerfing gemstones requires special measures in that a line must be cut, which is more difficult than machining a spot, and the line must have a cross-sectional shape suitable for a subsequent cleaving operation.

THE INVENTION

The present invention provides a method of kerfing a gemstone, comprising using a high energy, low order mode, laser beam. The present invention also provides apparatus for kerfing a gemstone, comprising a mount for holding the gemstone, and a laser arranged to lase the gemstone with a high energy, low order mode, laser beam.

A single order mode beam has a Gaussian energy distribution across the beam section, and a low order mode beam (which approximates to or is close to a single order mode beam) has a roughly Gaussian energy distribution across the beam section and hence a significantly higher energy in the centre that at the edges. Such a beam produces good kerfing geometry, that is to say a V-cut which is moderately "clean", i.e. smooth sided, and the cut is wide enough to receive the tip of a cleaving tool, possibly without having to index the beam across the width of the cut (the width being the dimension normal to the length or maximum dimension of the cut)—the cut can for instance be $250\mu$ wide and $300\mu$ or $400\mu$ deep, and the included angle of the V can be about 35° (or say 20° for smaller kerfs). Furthermore, a diamond does not tend to chip and the cuts are also more reproducible. If the beam has low divergence, the size of the focussed spot is smaller—for instance, the divergence of the cone of the beam which contains 90% of the radiation can be 0.8 mRad (milliradian).

The high energy content of the beam causes the diamond to graphitise, and although the energy absorption (in the zone of the focus of the beam) is rather low at first (say about 15% at room temperature), there is enough energy absorbed rapidly to heat the diamond during a single pulse, and as the energy rises, the percentage energy absorption increases up to a temperature at which graphitisation occurs. Normally, a laser beam will be pulsed, either by chopping the beam itself (Q switched) or by pulsing the energy input. The heating effect is assisted by a high pulse rate (i.e. repetition rate), which allows high rates of energy emission. Preferred pulse rates are from 10 Hz upwards, the higher rates of 20, 25 or 50 Hz or more (e.g. up to 85 Hz) being preferred. The rate however can be lower than 10 Hz. At 10 Hz, the pulse energy would have to be very high in order to achieve the required heating effect, and below 10 Hz, say at 5 Hz, the pulse energy required may be so high as to damage the stone. For this reason, the preferred minimum rate is 20 or 25 Hz, higher repetition rates being more viable economically. The upper limit is set when too much energy is put into the stone, causing damage. Pulse durations are preferably from 50 $\mu$sec up to 150 $\mu$sec, a good duration being about 75 $\mu$sec ($\mu$sec$=10^{-6}$ sec).

A suitable energy range for the laser beam is 150 to 1000 mJ per pulse, the preferred energy being around 400 mJ per pulse (mJ$=10^{-3}$ J).

The preferred laser is a solid state laser, e.g. a Nd/YAG laser, which produces a beam of a wavelength of $1.06\mu$ ($\mu=10^{-6}$ m). This wavelength is preferred for working diamonds as it produces a smaller diameter focussed machining spot and a greater depth of focus than say a $CO_2$ gas laser ($10.6\mu$). The size of the focussed spot is important in minimising wastage of gemstone. A greater depth of focus makes focusing less critical. The apparatus has a finite depth of focus, and, at the start of working, the surface of the gemstone is positioned roughly in the middle of the focal range; as the cut penetrates, the beam may become slightly out of focus, but once (in the case of diamonds in particular) cutting has begun and graphitisation has occurred, this is not critical. As an example, the depth of focus may be $\pm 0.75$ mm and the depth of a kerf 0.5 mm. In general terms, the beam is focussed substantially on the surface of the gemstone.

Suitable high energy, high pulse rate, low order mode, laser output can be achieved from a Nd/YAG laser in several ways. The laser may be pulse pumped and arranged to produce a substantially Gaussian energy distribution output by aperturing the multimode output (non-Gaussian) from a conventional laser optical resonator. Alternatively, special laser resonator optical designs, such as an unstable resonator or a stable resonator with an intracavity telescope, may be employed to produce a quasi or substantially Gaussian output energy distribution. Permissible pulse lengths in the region 50-150 $\mu$sec may be used for such systems although much shorter pulse lengths (15 $\mu$sec) can also be produced to machine diamond by tailoring the pulses from a pulse-pumped laser. Acceptable repetition rates with such lasers are from 10 Hz to 150 Hz; the preferred rate will depend on the type and quality of diamond being kerfed.

A continuously pumped Nd/YAG laser may also be used with suitable resonator optics and beam aperturing to produce a low order mode or substantially clean Gaussian output energy distribution. The output from such a laser must be Q-switched to produce high energy, high repetition rate pulses with acceptable pulse lengths usually in the range 50–200 nsec (nsec=$10^{-9}$ sec) and a repetition rate frequency in the range 0.5–5.0 KHz.

Due to the value of the gemstone material, small errors in setting up and registration can be very expensive, and thus a special optical system has been designed to ensure accurate working as the beam is moved along the kerf line—the word "optical" includes all suitable laser wavelengths, particularly infra-red wavelengths. The present invention also provides, whether or not associated with the foregoing specific laser, apparatus for kerfing a gemstone, comprising a mount for holding the gemstone, a laser arranged to lase the gemstone with a laser beam, reflecting means which bend the beam through a substantial angle (preferably 90°) and which is moveable substantially parallel to the axis of the beam incident on the reflecting means, for moving the beam along the line to be kerfed, and a focusing arrangement which focuses the beam. Although there are other arrangements for translating the focal point so as to cut along the line, this arrangement is especially suitable as it can provide the accuracy required for kerfing a gemstone. The beam incident on the focusing means is preferably substantially parallel.

Preferably, the apparatus is such that the focal point can be viewed along the optical axis of the focusing arrangement, e.g. by using reflecting means which behave differently for the laser wavelength and for at least one visible wavelength. A convenient arrangement is to use a reflecting means which reflects the laser wavelengths and allows at least part of the visible wavelength to pass through without reflection. In practice, a mark is made by hand on the gemstone to indicate where the cut should be initiated, and this mark can be viewed to ensure that cutting does start on the correct spot, thereby ensuring accuracy and saving material. For convenience, the apparatus can include a further reflecting means fixed to the first reflecting means and moving with it and reflecting the non-laser visible wavelength along the axis parallel to the axis of the incident beam referred to above. In this way, the actual viewer need not move. It will be noted that the focusing arrangement can also be fixed to the two reflecting means so that all three move together. Adjustment of the position of the focal point in a direction at right angles to the cutting line can be provided using an arrangement described in detail in GB 2 052 369 A.

PREFERRED EMBODIMENT

A preferred embodiment of the invention is now particularly described, with reference to the accompanying drawing, in which.

Figure 1:
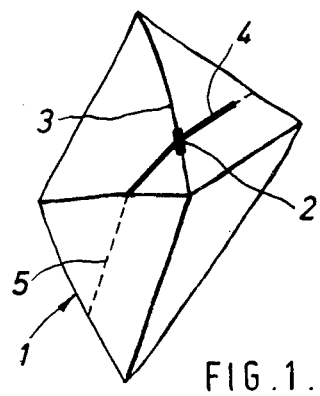
FIG. 1 is a view of a diamond which has been marked prior to kerfing and then cleaving.

In FIG. 1, the diamond has been marked with a cross 2 to indicate the centre of the kerfing cut. It will be seen that one limb of the cross is marked along an edge 3 of the diamond while the other limb follows the proposed cutting line 4, the two limbs of the cross usually not being at 90° to each other. The dashed line 5 indicates the subsequent cleavage.

Figure 2:
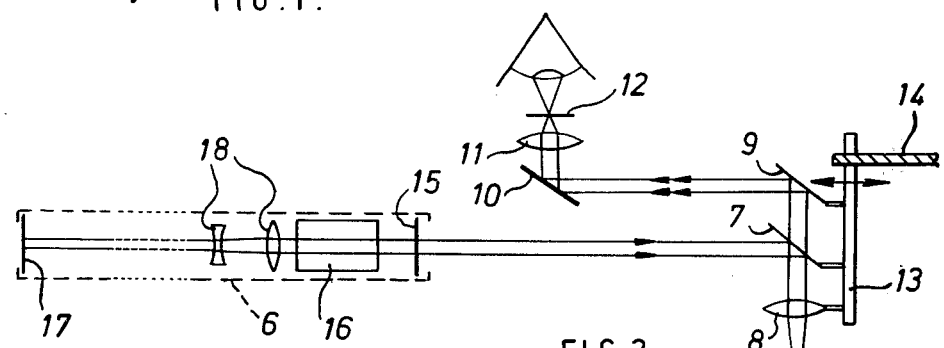
FIG. 2 is a schematic side view of apparatus in accordance with the invention, the diamond being shown greatly enlarged.

In the apparatus of FIG. 2, there is an Nd/YAG laser 6 which provides a substantially parallel, high energy, high pulse rate, low order mode beam indicated by the small single-headed arrows. The beam is bent through 90° by a mirror 7 which is reflective for the infra-red light of the laser but it is not as reflective for visible wavelengths. The beam then passes through a focusing arrangement 8 and is focussed onto the diamond 1, which is in a suitable holder such as that disclosed in GB 2 052 369 A, referred to above. The focal point can be viewed directly through the mirror 7 by way of two further mirrors 9, 10 and a suitable eye piece and filter 11 which includes crosswires 12, the visible light being indicated by two small double-headed arrows. The mirrors 9, 10 can be surface silvered in the normal way so as to be fully reflective.

As indicated in a schematic manner, the focusing arrangement 8, mirror 7 and mirror 9 are all fixed to a single support mount 13 which can be indexed in the direction indicated by the large double arrows by means of a lead screw 14. This lead screw can be connected to a shaft encoder for control of the translatory movement of the mount 13.

Figure 3:
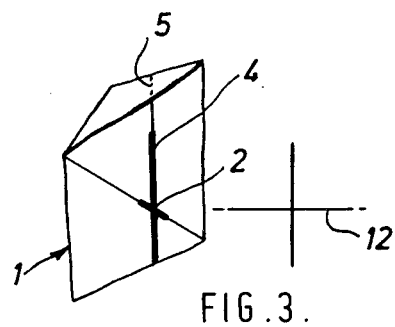
FIG. 3 is a view of the diamond, as it would be seen through the cross-wires of the apparatus of FIG. 2.

As part of the setting-up procedure, the diamond 1 is positioned so that the cross-limb of the cross 2 appears straight, as seen in FIG. 3, and the cross 2 is in register with the cross-wires 12 (which are shown to the side of FIG. 3 for clarity), the assumption being that the cross-limb of the cross 2 is already in register with the cutting line 4. However, for resetting, the lead screw 14 can be rotated manually to place the centre of the cross 2 on the centre of the cross-wires 12. If the correct setting of the mirrors etc. is to be checked, the laser can then give a single pulse on a test piece which is viewed through the eye-piece 11 to ensure that it is the centre of the cross 2.

Figure 4:
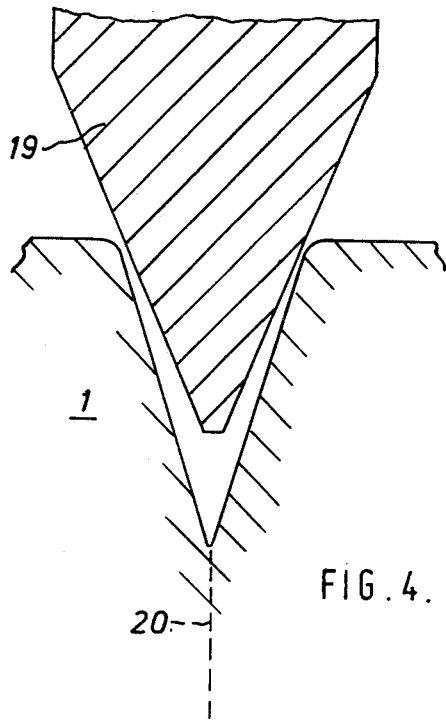
FIG. 4 is an enlarged cross-section through the kerf, also showing the tip of the cleaving tool.

Assuming that the setting-up is correct, the laser is switched on and the lead screw 14 makes several complete traverses or passes, thus moving or traversing the laser beam relative to the diamond and forming a kerf on the diamond 1 along the line 4. FIG. 4 shows one suitable kerf, with an included angle of 35° and a depth of about 400 $\mu$m.

It is found that it may be necessary to index the beam across the width of the cut as well as traversing along the length, though this depends upon the exact type of laser beam being used.

In more detail, the laser 6 may be configured with a stable resonator comprising an output mirror 15, a Nd/YAG laser rod 16 and a 100% reflecting mirror 17. Between the rod 16 and the mirror 17 is a beam reducing/beam expanding telescope 18 (an intracavity telescope) with a magnification of 2X, and the mirror 17 is sufficient distance away for sufficient diffraction to be achieved to discriminate against higher order modes, to give a cleaner, low divergence output beam which is substantially single mode; the output has a quasi-Gaussian beam profile. The pulse rate was 50 Hz.

Instead of the eye piece 11 and cross-wires 12, a television viewer could be used, e.g. with electronically generated cross-wires 12.

In accordance with normal practice, a cleaving tool 19 can have its tip inserted in the kerf and the diamond 1 can be cleaved. A suitable holder for this is disclosed in GB 2 052 369 A, referred to above. The cleaving plane 20 is indicated.

I claim:
1. A method of cleaving a gemstone, comprising:

mounting said gemstone in position, said gemstone having a surface to be kerfed;
generating a high energy, low order mode, laser beam;
focussing said beam substantially on said surface, thereby removing gemstone material from said surface;
moving said beam relative to said surface, thereby cutting a kerf; and
inserting the tip of a tool in said kerf and thereby cleaving the gemstone.

2. The method of claim 1, wherein said laser beam is a pulsed beam having a pulse rate of at least 20 Hz.

3. The method of claim 1, wherein said laser beam has a wave length of about 1 $\mu$m.

4. The method of claim 1, wherein said laser beam is generated by a Nd/YAG laser having a stable resonator with an intracavity telescope.

5. The method of claim 1 or 4, wherein said laser beam is generated by a laser having a stable resonator with an intracavity telescope, the beam being pulsed with a pulse rate of at least 20 Hz, having a wave length of about 1 $\mu$m and low divergence.

6. The method of claim 1, wherein a substantially parallel laser beam is generated, and there are provided reflecting means on which said parallel beam is incident and which bend said parallel beam through a substantial angle, and moving means for moving said reflecting means in a direction substantially parallel to the axis of the said incident parallel beam, thereby moving said beam relative to said surface, to cut said kerf in said surface.

7. The method of claim 6, wherein said reflecting means is reflective for the wavelength of said parallel beam but is less reflective for at least one visible wavelength, means being provided for viewing said surface of said gemstone by eye through the back of said reflecting means, thereby viewing the focal point of said laser beam on said surface.

* * * * *